US012768427B2

(12) United States Patent
Hotta et al.

(10) Patent No.: US 12,768,427 B2
(45) Date of Patent: Oct. 20, 2026

(54) LIQUID-FILLED TUBULAR VIBRATION DAMPING DEVICE

(71) Applicant: Sumitomo Riko Company Limited, Aichi (JP)

(72) Inventors: Kazuki Hotta, Komaki (JP); Katsuzou Okada, Komaki (JP)

(73) Assignee: Sumitomo Riko Company Limited, Aichi (JP)

( * ) Notice: Subject to any disclaimer, the term of this patent is extended or adjusted under 35 U.S.C. 154(b) by 342 days.

(21) Appl. No.: 18/507,079

(22) Filed: Nov. 12, 2023

(65) Prior Publication Data

US 2024/0159291 A1 May 16, 2024

(30) Foreign Application Priority Data

Nov. 14, 2022 (JP) ................................ 2022-181626

(51) Int. Cl.
*F16F 13/14* (2006.01)
*F16F 9/32* (2006.01)
(Continued)

(52) U.S. Cl.
CPC .......... *F16F 15/023* (2013.01); *F16F 9/3235* (2013.01); *F16F 13/06* (2013.01)

(58) Field of Classification Search
CPC ........ F16F 15/023; F16F 9/3235; F16F 13/06; F16F 13/14; F16F 13/1463
See application file for complete search history.

(56) References Cited

U.S. PATENT DOCUMENTS

| | | | | |
|---|---|---|---|---|
| 5,887,844 A * | 3/1999 | Fujiwara | ................. | F16F 13/14 267/140.11 |
| 6,036,182 A * | 3/2000 | Okanaka | ................. | F16F 13/14 267/140.12 |

(Continued)

FOREIGN PATENT DOCUMENTS

| | | | |
|---|---|---|---|
| CN | 118482132 A * | 8/2024 | ............ F16F 13/103 |
| JP | H08177951 | 7/1996 | |

(Continued)

OTHER PUBLICATIONS

"Notice of Reasons for Refusal of Japan Counterpart Application", issued on Apr. 30, 2026, with English translation thereof, p. 1-p. 7.

*Primary Examiner* — Thomas W Irvin
(74) *Attorney, Agent, or Firm* — JCIPRNET

(57) ABSTRACT

A liquid-filled tubular vibration damping device including: an inner axial member; an intermediate sleeve made of synthetic resin and formed by twin sleeve divisions and divided in a circumferential direction; a main rubber elastic body connecting the inner axial member and a tubular part of the intermediate sleeve; an outer tubular member receiving the tubular part inserted therein; twin liquid chambers formed in the main rubber elastic body and communicated by an orifice passage; an outer flange formed at a first end in an axial direction of the tubular part of the intermediate sleeve; an outer circumference rubber fixed to an outer circumferential surface of the tubular part to be press-fitted in the outer tubular member; and an orifice groove formed in the outer circumference rubber and covered by the outer tubular member so that the orifice passage is formed.

7 Claims, 9 Drawing Sheets

(51) Int. Cl.
*F16F 13/06* (2006.01)
*F16F 15/023* (2006.01)

(56) References Cited

U.S. PATENT DOCUMENTS

| | | | | |
|---|---|---|---|---|
| 9,995,363 | B2 * | 6/2018 | Shinohara | B60G 7/008 |
| 10,107,354 | B2 * | 10/2018 | Kojima | F16F 13/16 |
| 10,359,091 | B2 * | 7/2019 | Satou | F16F 15/08 |
| 10,760,642 | B2 * | 9/2020 | Yamada | F16F 13/1463 |
| 2016/0290433 | A1 * | 10/2016 | Shinohara | F16F 13/1463 |
| 2017/0299008 | A1 * | 10/2017 | Satou | F16F 13/1409 |
| 2017/0299011 | A1 * | 10/2017 | Kojima | F16F 13/14 |
| 2019/0360551 | A1 * | 11/2019 | Yamada | F16F 13/1454 |
| 2022/0282764 | A1 * | 9/2022 | Hosoda | F16F 13/1481 |

FOREIGN PATENT DOCUMENTS

| | | | |
|---|---|---|---|
| JP | 2016133181 | | 7/2016 |
| JP | 2019203566 | | 11/2019 |
| JP | 2021032365 A | * | 3/2021 |

* cited by examiner

LIQUID-FILLED TUBULAR VIBRATION DAMPING DEVICE

INCORPORATED BY REFERENCE

The disclosure of Japanese Patent Application No. 2022-181626 filed on Nov. 14, 2022 including the specification, drawings and abstract is incorporated herein by reference in its entirety.

BACKGROUND ART

1. Technical Field

The present disclosure relates to a liquid-filled tubular vibration damping device used for power unit mounts and sub-frame mounts, etc. of automobiles.

2. Description of the Related Art

Conventionally, there have been known tubular vibration damping devices to be applied to power unit mounts that support power units including automotive engines and motors, sub-frame mounts that provide vibration damping linkage between sub-frames and vehicle bodies, suspension bushings that provide vibration damping linkage between suspension arms and vehicle bodies, and the like. Also, as a type of tubular vibration damping device, a liquid-filled tubular vibration damping device is known, such as the liquid-filled bushing disclosed in Japanese Unexamined Patent Publication No. JP-A-2016-133181, which utilizes the vibration damping action based on the flow action, etc. of a liquid sealed inside.

SUMMARY

By the way, the liquid-filled tubular vibration damping device has a structure in which an inner axial member and an intermediate sleeve are connected by a main rubber elastic body, as shown in JP-A-2016-133181. In such a structure, it is necessary to mold the main rubber elastic body and then reduce the diameter of the intermediate sleeve so that the main rubber elastic body is pre-compressed in the radial direction, in order to reduce or eliminate tensile stress due to thermal contraction after vulcanization molding of the main rubber elastic body.

The liquid-filled tubular vibration damping device is formed by externally fitting an outer tubular member onto the intermediate sleeve in a state that a separate orifice member is inserted in a window of the intermediate sleeve. Since an orifice passage is formed between the overlapped surfaces of the outer tubular member and the orifice member, it is necessary to seal a gap between the overlapped surfaces of the outer tubular member and the orifice member in a liquid-tight manner. Therefore, a sealing rubber layer is formed on the inner circumferential surface of the outer tubular member, and the outer tubular member is externally fitted onto the intermediate sleeve and the orifice member and then reduced in diameter, so that the outer tubular member is overlapped on the outer circumferential surface of the orifice member in a state of close contact with it via the sealing rubber layer.

Thus, in the conventional structure of the liquid-filled tubular vibration damping device, it is necessary to reduce the diameters of the intermediate sleeve and the outer tubular member, respectively, which increases the number of manufacturing processes. In addition, the orifice member must be assembled between the intermediate sleeve and the outer tubular member, which increases the number of parts.

It is therefore one object of the present disclosure to provide a liquid-filled tubular vibration damping device of novel structure which is able to achieve the desired performance by a simple structure with a small number of parts and a small number of manufacturing processes.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a liquid-filled tubular vibration damping device comprising: an inner axial member; an intermediate sleeve having a tubular part, the intermediate sleeve being made of a synthetic resin and having a structure which is formed by a pair of sleeve divisions and divided into two in a circumferential direction; a main rubber elastic body connecting the inner axial member and the tubular part of the intermediate sleeve; an outer tubular member receiving the tubular part of the intermediate sleeve such that the tubular part is inserted in and assembled to the outer tubular member; a pair of liquid chambers formed in the main rubber elastic body; an orifice passage communicating the pair of liquid chambers with each other; an outer flange formed at a first end in an axial direction of the tubular part of the intermediate sleeve; an outer circumference rubber fixed to an outer circumferential surface of the tubular part of the intermediate sleeve, the tubular part to which the outer circumference rubber is fixed being secured press-fit in and assembled to the outer tubular member; and an orifice groove formed in the outer circumference rubber and covered by the outer tubular member so that the orifice passage is formed.

According to the preferred embodiment, the intermediate sleeve has a structure which is constituted by the pair of sleeve divisions and divided into two. Thus, for example, by forming the main rubber elastic body in a state where a gap exists between the sleeve divisions, the action of tensile stress on the main rubber elastic body during thermal contraction of the main rubber elastic body is reduced or avoided owing to the mutually approaching displacement of the sleeve divisions. Therefore, it is not necessary to reduce the diameter of the intermediate sleeve after molding the main rubber elastic body, and the number of manufacturing processes can be reduced.

The orifice groove is formed in the outer circumference rubber fixed to the outer circumferential surface of the tubular part of the intermediate sleeve, and the orifice passage is formed by covering the opening of the orifice groove with the outer tubular member. Therefore, a separate part (orifice forming member) to form the orifice passage is not necessary, which reduces the number of parts and facilitates the assembly work of the outer tubular member to the intermediate sleeve. The orifice groove need only be formed using the outer circumference rubber and open to the surface of the outer circumference rubber. For example, the bottom surface of the orifice groove may be formed by the intermediate sleeve.

By eliminating a separate orifice forming member, the intermediate sleeve can be secured press-fit into the outer tubular member. As a result, the intermediate sleeve and the outer tubular member can be secured to each other without the diameter reduction process of the outer tubular member. Besides, the outer circumference rubber fixed to the outer circumferential surface of the intermediate sleeve is pressed against the inner circumferential surface of the outer tubular member to seal the wall of the orifice passage, thereby avoiding performance degradation due to leakage of the liquid in the orifice passage.

The intermediate sleeve has a complicated shape due to the projections and recesses of the outer circumferential surface to which the outer circumference rubber is fixed and a window to form a liquid chamber, etc. This tends to make it difficult to form the outer flange in the case of a conventional intermediate sleeve made of metal. Since the intermediate sleeve of the present preferred embodiment is a molded article made of synthetic resin, the outer flange can be easily formed despite a complicated shape with projections and recesses, etc. of the outer circumferential surface. Moreover, since the intermediate sleeve has a structure which is divided into two and does not require diameter reduction process after molding of the main rubber elastic body, even when the intermediate sleeve is provided with the outer flange, the outer flange does not interfere with the diameter reduction process.

A second preferred embodiment provides the liquid-filled tubular vibration damping device according to the first preferred embodiment, wherein the outer tubular member is constituted by a single fitting to which any rubber is not fixed.

With this preferred embodiment, compared with the conventional structure in which the outer tubular member is a rubber vulcanization molded component incorporating a sealing rubber and a stopper rubber, the structure on the side of the outer tubular member is simplified and the manufacturing process is facilitated by omitting the vulcanization molding process of the rubber.

A third preferred embodiment provides the liquid-filled tubular vibration damping device according to the second preferred embodiment, wherein a stopper rubber is fixed to a first surface of the outer flange in the axial direction and protrudes to a side opposite to the tubular part in the axial direction, and a contact rubber is fixed to a second surface of the outer flange in the axial direction and interposed between the outer flange and the outer tubular member in the axial direction.

According to this preferred embodiment, the outer flange to which the stopper rubber and the contact rubber are fixed is provided, not on the outer tubular member but on the intermediate sleeve. By so doing, while the outer tubular member is a single fitting to which any rubber is not fixed, it is possible to provide an axial stopper including the stopper rubber and buffer contact between the intermediate sleeve and the outer tubular member via the contact rubber.

A fourth preferred embodiment provides the liquid-filled tubular vibration damping device according to any one of the first through third preferred embodiments, wherein in the tubular part of the intermediate sleeve, a middle portion in the axial direction is a thick-walled portion thickened than both end portions.

With this preferred embodiment, when employing the intermediate sleeve made of synthetic resin, which tends to have a small rigidity than one made of metal, the strength (durability) of the intermediate sleeve can be improved by thickening the axially middle portion of the tubular part which is fixed to the main rubber elastic body, and making it the thick-walled portion. The thick-walled portion can be also utilized to form a concave groove or the like for forming the orifice passage in the intermediate sleeve. In other words, in the present preferred embodiment, for example, it is possible to form the orifice passage and a window connecting the end of the orifice passage to the liquid chamber, in the thick-walled portion of the intermediate sleeve.

A fifth preferred embodiment provides the liquid-filled tubular vibration damping device according to any one of the first through fourth preferred embodiments, wherein a pair of windows are formed through the tubular part of the intermediate sleeve, and the pair of liquid chambers are formed including the pair of windows, in at least one edge of at least one of the windows in the axial direction, a circumferential extension is provided extending from a circumferential edge of the at least one of the windows into the at least one of the windows, and a portion of the orifice groove is formed in the circumferential extension.

According to this preferred embodiment, providing the circumferential extension in the intermediate sleeve further narrows the area which is formed only by the outer circumference rubber in the wall of the orifice passage. This reduces pressure loss due to deformation of the wall of the orifice passage, thereby efficiently making the fluid flow through the orifice passage.

A sixth preferred embodiment provides the liquid-filled tubular vibration damping device according to the fifth preferred embodiment, wherein the circumferential extension is provided on each side of the at least one of the windows in the axial direction.

With this preferred embodiment, for example, when the orifice passage extending on both axial sides of the window is formed, the deformation rigidity of the wall of the orifice passage is enhanced over a longer range, so as to improve the vibration damping effect owing to the orifice passage.

A seventh preferred embodiment provides the liquid-filled tubular vibration damping device according to any one of the first through sixth preferred embodiments, wherein a distance between circumferential edge surfaces of the pair of sleeve divisions in the intermediate sleeve is shortened by compressing the main rubber elastic body on press-fit assembly of the intermediate sleeve into the outer tubular member.

According to this preferred embodiment, during the press-fit assembly of the pair of sleeve divisions into the outer tubular member, the pair of sleeve divisions are displaced to approach each other, and pre-compression is applied to the main rubber elastic body. This reduces the tensile stress acting on the main rubber elastic body when it is deformed upon a vibration input, thereby improving the durability of the main rubber elastic body.

An eighth preferred embodiment provides the liquid-filled tubular vibration damping device according to any one of the first through seventh preferred embodiments, wherein at a second end of the tubular part of the intermediate sleeve in the axial direction, a positioning projection is provided projecting to an outer circumference and facing the outer flange in the axial direction, and the outer tubular member is assembled to the intermediate sleeve between the outer flange and the positioning projection in the axial direction, and the outer tubular member is positioned relative to the intermediate sleeve in the axial direction.

With this preferred embodiment, by positioning and assembling the outer tubular member in the appropriate axial position relative to the intermediate sleeve, for example, the orifice groove of the outer circumference rubber is reliably covered by the outer tubular member to prevent short-circuit leakage, etc. of the liquid in the orifice passage.

According to the present disclosure, the target performance can be achieved with a simple structure having a small number of parts and a small number of manufacturing processes in the liquid-filled tubular vibration damping device.

BRIEF DESCRIPTION OF THE DRAWINGS

The foregoing and/or other objects, features and advantages of the disclosure will become more apparent from the following description of a practical embodiment with reference to the accompanying drawings in which like reference numerals designate like elements and wherein.

DETAILED DESCRIPTION

There will be described the practical embodiment of the present disclosure with reference to the drawings.

Figure 1:
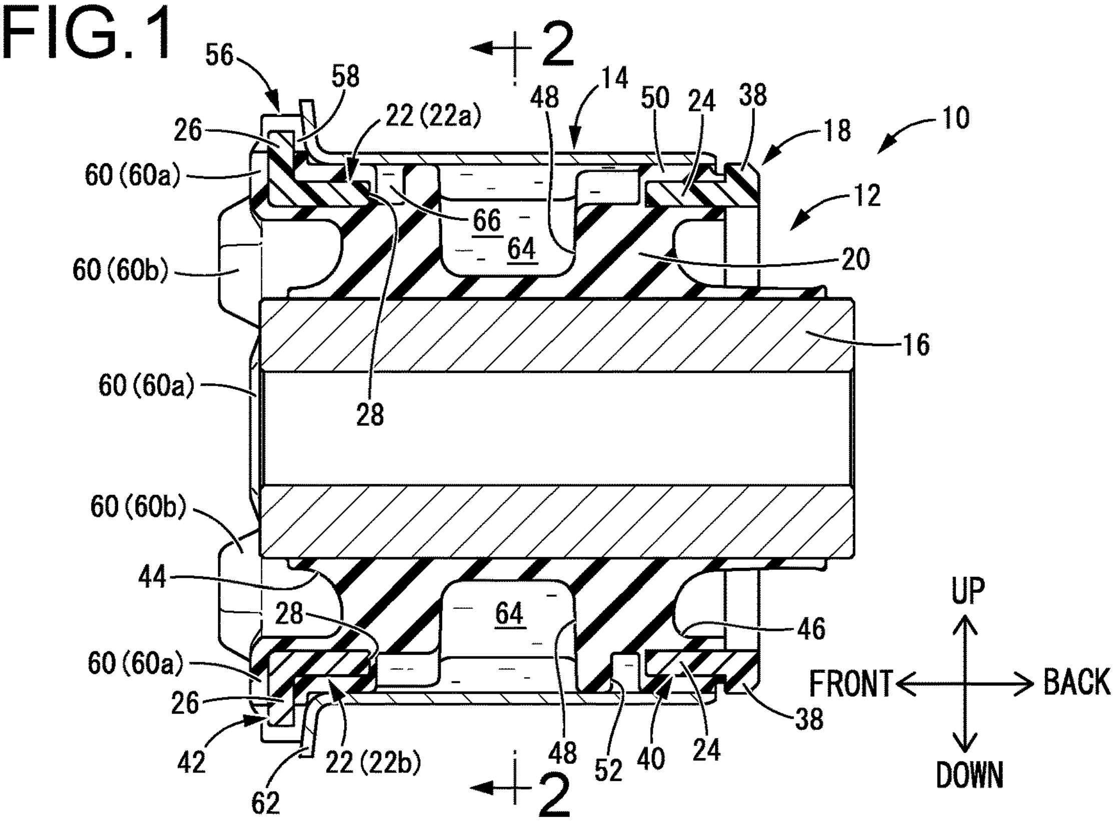
FIG. 1 is a cross section view of a liquid-filled tubular vibration damping device in the form of a member mount as a first practical embodiment of the present disclosure, taken along line 1-1 of FIG. 2.
Figure 2:
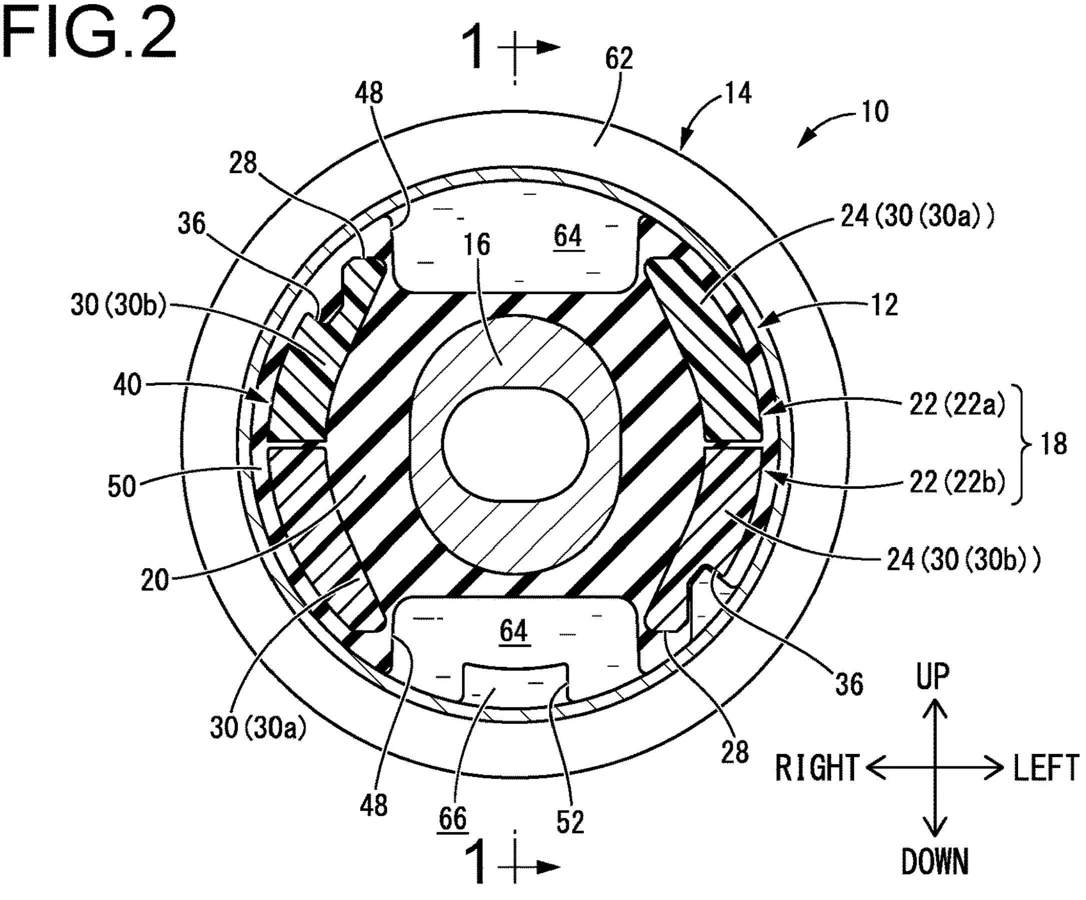
FIG. 2 is a cross section view taken along line 2-2 of FIG. 1.

FIGS. 1 and 2 show a member mount 10 of an automobile as a first practical embodiment of a liquid-filled tubular vibration damping device structured according to the present disclosure. The member mount 10 has a structure in which an outer tubular member 14 is attached to an integrally vulcanization molded component 12. The integrally vulcanization molded component 12 has a structure in which an inner axial member 16 and an intermediate sleeve 18 are elastically connected by a main rubber elastic body 20, as shown in FIGS. 3 through 12. In the following description, in principle, the vertical direction means the up-down direction in FIG. 1, the front-back direction means the left-right direction in FIG. 1, and the left-right direction means the left-right direction in FIG. 2.

Figure 3:
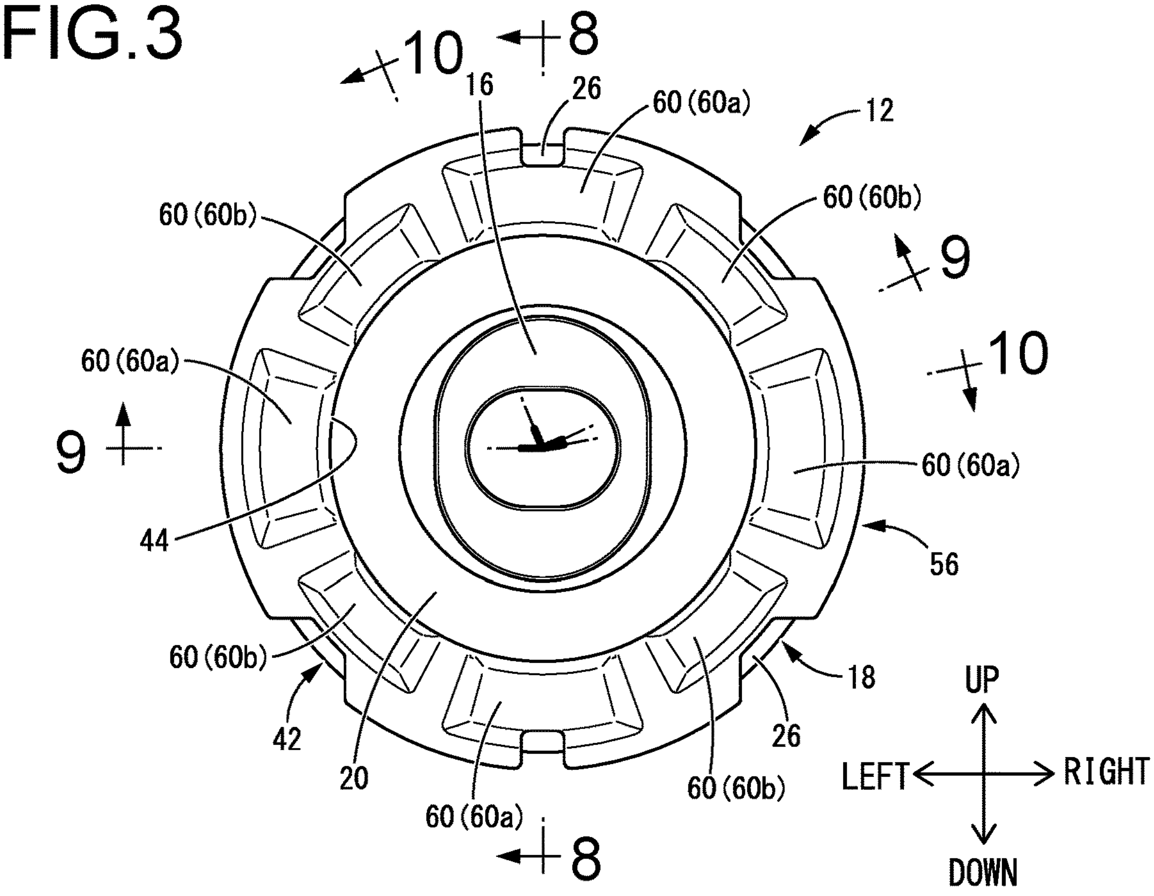
FIG. 3 is a front view of an integrally vulcanization molded component constituting the member mount shown in FIG. 1.

The inner axial member 16 is a small-diameter tubular member, as shown in FIGS. 1, 2, and 8 through 12, and extends linearly in the front-back direction with a roughly constant cross-sectional shape. The inner axial member 16 is a rigid member formed of a metal, a synthetic resin, or the like. As shown in FIG. 3, the inner and outer circumferential surfaces of the inner axial member 16 are both elliptical in cross section, and the major axis directions of the inner and outer circumferential surfaces are orthogonal to each other. However, in relation to the inner axial member, at least one of the inner and outer circumferential surfaces may be circular or noncircular such as polygonal, for example.

The intermediate sleeve 18 is located on the outer circumferential side of the inner axial member 16, as shown in FIGS. 8 through 12. The intermediate sleeve 18 is a molded article made of a synthetic resin such as polyamide. The intermediate sleeve 18 has a divided structure formed by a pair of sleeve divisions 22*a*, 22*b*. As shown in FIGS. 13 through 19, the sleeve division 22 has a substantially semi-circular tube shape as a whole, and a flanged portion 26 is integrally formed protruding toward the outer circumference at the first end in the axial direction of a semi-cylindrical part 24. The upper sleeve division 22*a* is shown in FIGS. 13 to 19. The lower sleeve division 22*b* has a structure in common with the upper sleeve division 22*a* that is rotated by 180 degrees, so the explanation of the lower sleeve division 22*b* is omitted by explaining the upper sleeve division 22*a*.

The semi-cylindrical part 24 has a window 28 formed through it in the radial direction. The window 28 is approximately rectangular as viewed in the vertical direction. The window 28 is formed in a center portion of the semi-cylindrical part 24 in the circumferential direction and the axial direction. The window 28 is formed over a length of about ⅓ of the circumference of the semi-cylindrical part 24 in the circumferential direction.

The middle portion in the axial direction of the semi-cylindrical part 24 is a thick-walled portion 30 with a larger thickness dimension in the radial direction. The thick-walled portion 30 is provided on each outside of the window 28 in the circumferential direction and has a thicker wall protruding into the inner circumference than the both end portions in the axial direction. The thick-walled portion 30 of the semi-cylindrical part 24 has a circumferential groove 32 that opens on the outer circumferential surface and extends in the circumferential direction. The circumferential groove 32 is formed at each axial end of the thick-walled portion 30. The circumferential grooves 32 are formed in the thick-walled portions 30*a*, 30*b* on both sides of the window 28 in the circumferential direction. The circumferential grooves 32 are open at one circumferential end to the circumferential end face of the semi-cylindrical part 24 and at the other circumferential end to the window 28 in the circumferential direction.

Figure 15:
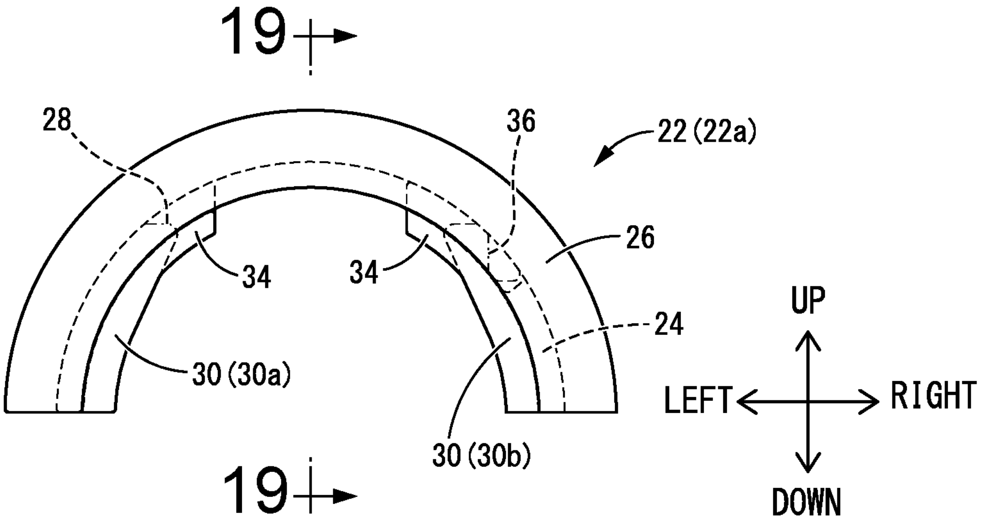
FIG. 15 is a front view of the sleeve division shown in FIG. 13.
Figure 16:
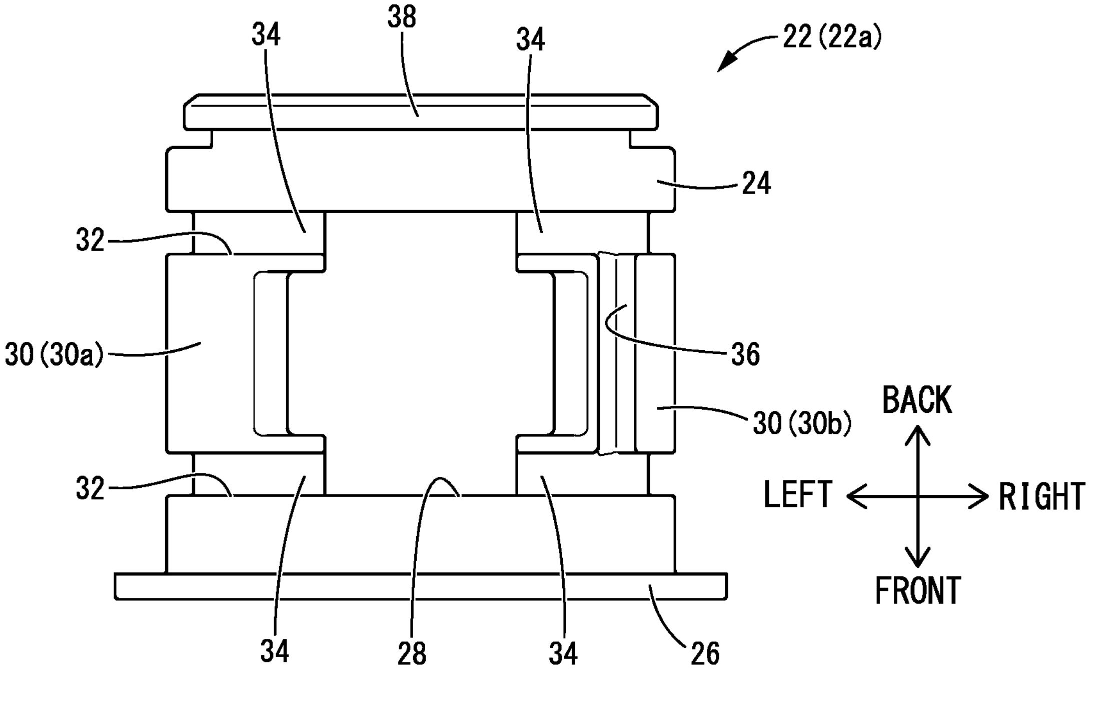
FIG. 16 is a plan view of the sleeve division shown in FIG. 13.
Figure 17:
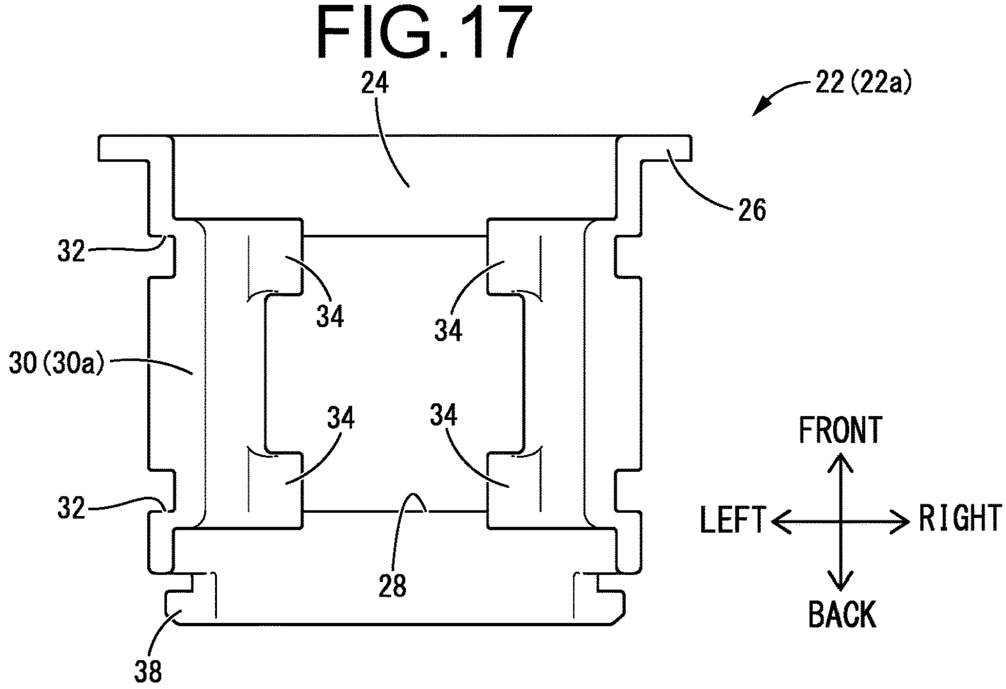
FIG. 17 is a bottom view of the sleeve division shown in FIG. 13.
Figure 18:
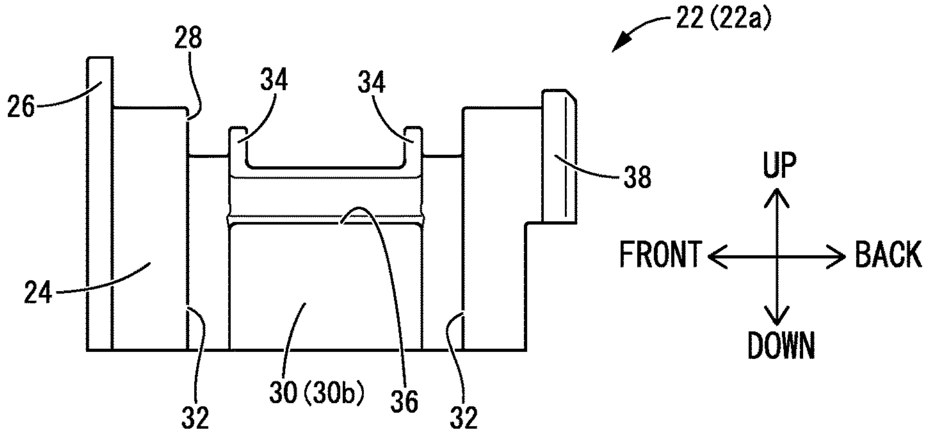
FIG. 18 is a right-side view of the sleeve division shown in FIG. 13.
Figure 19:
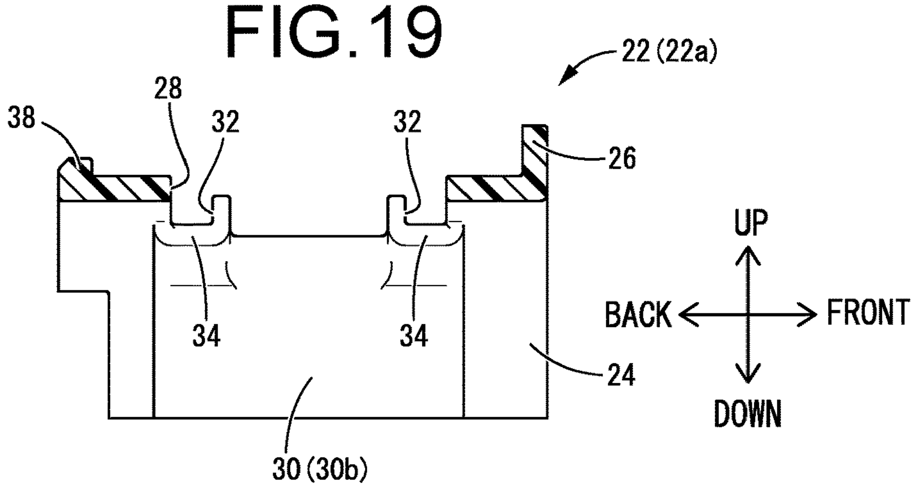
FIG. 19 is a cross section view taken along line 19-19 of FIG. 15.

At the four corner portions of the window 28, circumferential extensions 34 are provided extending from the circumferential edge of the window 28 into the window 28. The circumferential extensions 34 extend in the circumferential direction with an approximately L-shaped cross-section as shown in FIGS. 16 and 19. Owing to the circumferential extensions 34, the circumferential grooves 32 extend inwardly in the circumferential direction beyond the circumferential edges of the window 28, as shown in FIG. 16, so that the circumferential grooves 32 are elongated in the circumferential direction. The curvature of the inner circumference of the circumferential extension 34 is different from the curvature of the inner circumference of the thick-walled portion 30, as shown in FIG. 15. The protrusion dimension to the inside in the vertical direction of the circumferential extension 34 is smaller than the protrusion dimension to the inside in the left-right direction of the thick-walled portion 30, thereby adjusting the spring ratio of the main rubber elastic body 20 in the vertical direction and the left-right direction, as described below. The circumferential extension 34 is provided on each side of the window 28 in the axial direction in this practical embodiment, but may be provided only on either side in the axial direction. The circumferential extension 34 is provided on each side of the window 28 in the circumferential direction in this practical embodiment, but may be provided on only either side of the window 28 in the circumferential direction. As can be seen from the above description, the number of the circumferential extensions 34 is not particularly limited, and it is not necessary to provide four circumferential extensions 34.

The thick-walled portions 30*a*, 30*b* provided on both sides of the window 28 in the circumferential direction have a longitudinal groove 36 extending in the axial direction only in the thick-walled portion 30*b*, as shown in FIGS. 16 and 19, which connects the circumferential grooves 32, 32 on both sides in the axial direction. The longitudinal groove 36 is provided in the thick-walled portion 30, close to the window 28 in the circumferential direction, so as to extend linearly in the axial direction.

In this way, the circumferential grooves 32, 32 and the longitudinal groove 36 are formed in the thick-walled portion 30 provided at the middle of the semi-cylindrical part 24 in the axial direction, thereby preventing the semi-cylindrical part 24 from becoming excessively thin at the portions where the circumferential grooves 32, 32 and the longitudinal groove 36 are formed, and thus securing the strength of the semi-cylindrical part 24.

At the first end (the front end) of the semi-cylindrical part 24 in the axial direction, the flanged portion 26 is integrally formed protruding to the outer circumference. The flanged portion 26 is in the form of a semi-annular plate extending approximately halfway around the circumference. The circumferential length dimension of the flanged portion 26 is almost the same as the circumferential length dimension of the semi-cylindrical part 24.

A positioning projection 38 is integrally formed at the second end (the rear end) of the semi-cylindrical part 24 in the axial direction. The positioning projection 38 projects from the rear end of the semi-cylindrical part 24 to the outer circumference and faces the flanged portion 26 in the axial direction. The positioning projection 38 has a smaller circumferential length dimension than the flanged portion 26 and is provided at the circumferential center portion of the semi-cylindrical part 24, off the both circumferential end portions. In this practical embodiment, for the axial rear end of the semi-cylindrical part 24 where the positioning projection 38 is provided, the circumferential length is also shortened, and the axial length of the semi-cylindrical part 24 is shortened at both circumferential end portions.

The pair of sleeve divisions 22*a*, 22*b* are assembled facing each other to constitute the tubular intermediate sleeve 18. In the intermediate sleeve 18, the sleeve divisions 22*a*, 22*b* have circumferential edge surfaces facing each other in the circumferential direction. A tubular part 40 in a substantially cylindrical shape as a whole is constituted by the semi-cylindrical parts 24, 24, and an outer flange 42 in an annular plate shape as a whole is constituted by the flanged portions 26, 26. The intermediate sleeve 18 has the pair of windows 28, 28 formed at opposite portions in the vertical direction.

The circumferential grooves 32 on the axially front side of the sleeve divisions 22*a*, 22*b* are connected to each other in the circumferential direction, communicating the windows 28, 28 of the sleeve divisions 22*a*, 22*b* with each other on both sides in the circumferential direction. Similarly, the circumferential grooves 32 on the axially rear side of the sleeve divisions 22*a*, 22*b* are connected to each other in the circumferential direction, communicating the windows 28, 28 of the sleeve divisions 22*a*, 22*b* with each other on both sides in the circumferential direction.

As shown in FIGS. 8 to 12, the intermediate sleeve 18 is externally disposed about the inner axial member 16, as the intermediate sleeve 18 is remoted from the inner axial member 16 to the outer circumferential side. The inner axial member 16 and the intermediate sleeve 18 are connected to each other by the main rubber elastic body 20. The main rubber elastic body 20 has an approximately cylindrical shape as a whole, and its inner circumferential surface is bonded by vulcanization to the inner axial member 16, and its outer circumferential surface is bonded by vulcanization to the intermediate sleeve 18. The main rubber elastic body 20 is formed as the integrally vulcanization molded component 12 including the inner axial member 16 and the intermediate sleeve 18.

The intermediate sleeve 18 has a division structure consisting of the pair of sleeve divisions 22*a*, 22*b*. Thus, even if the main rubber elastic body 20 contracts in the axis-perpendicular direction due to cooling after molding (thermal contraction), the sleeve divisions 22*a*, 22*b* move toward each other in the approaching direction, thereby reducing tensile strain on the main rubber elastic body 20. Therefore, it is not necessary to reduce the diameter of the intermediate sleeve 18 after molding the main rubber elastic body 20, thereby facilitating manufacturing, shortening the manufacturing time, and reducing the manufacturing costs, etc. by omitting the diameter reduction process. When setting the sleeve divisions 22*a*, 22*b* in the mold for molding the main rubber elastic body 20, it is desirable to set a predetermined gap between the sleeve divisions 22*a*, 22*b* in consideration of the mutual proximity displacement of the sleeve divisions 22*a*, 22*b* due to thermal contraction of the main rubber elastic body 20. As a result, a portion of the main rubber elastic body 20 is interposed between the sleeve divisions 22*a*, 22*b*. It is also desirable that a prescribed gap should remain between the sleeve divisions 22*a*, 22*b* after thermal contraction of the main rubber elastic body 20.

Figure 8:
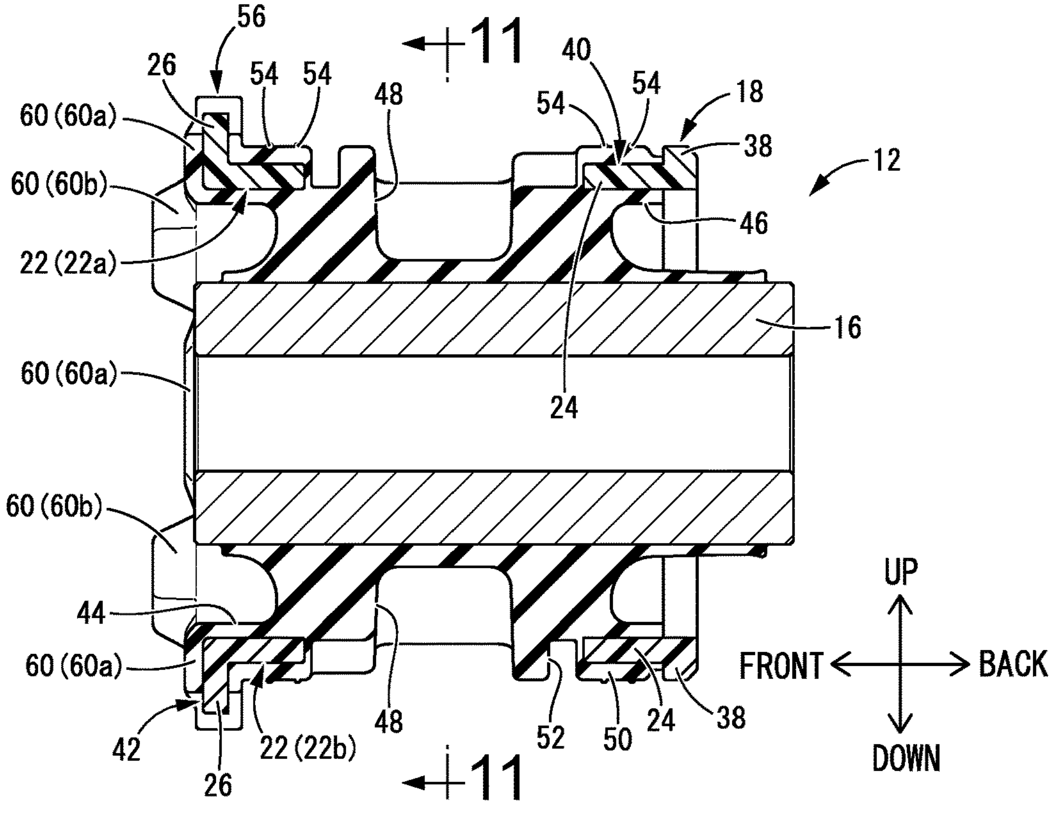
FIG. 8 is a cross section view taken along line 8-8 of FIG. 3.
Figure 9:
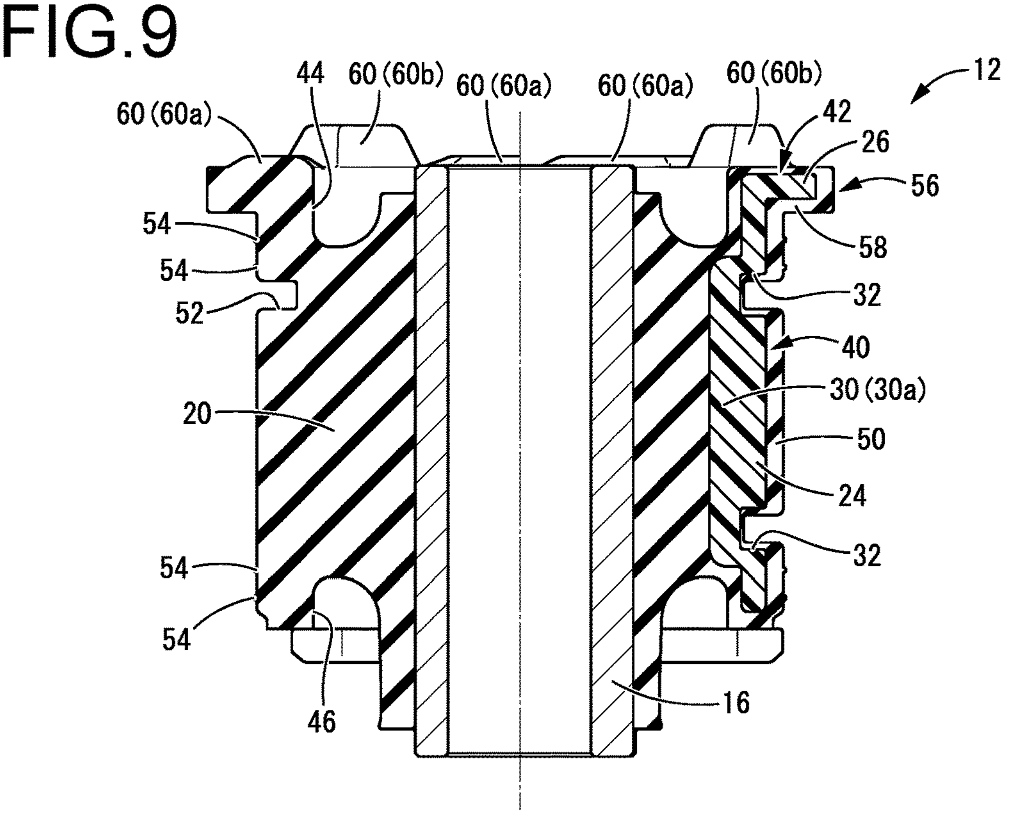
FIG. 9 is a cross section view taken along line 9-9 of FIG. 3.
Figure 10:
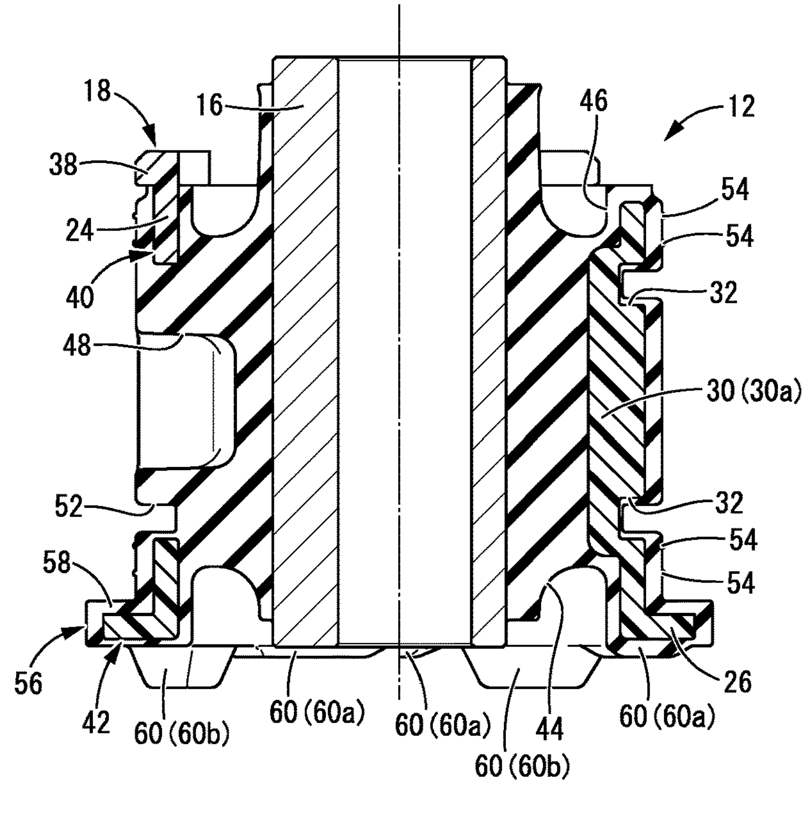
FIG. 10 is a cross section view taken along line 10-10 of FIG. 3.

As shown in FIGS. 8 to 10, the main rubber elastic body 20 is provided with a first bored groove 44 opening to one end face (the front end face) in the axial direction and a second bored groove 46 opening to the other end face (the rear end face) in the axial direction. The cross-sectional shape, the size including depth, and the like of each of the bored grooves 44, 46 are not particularly limited and are set as appropriate according to the required characteristics.

Figure 11:
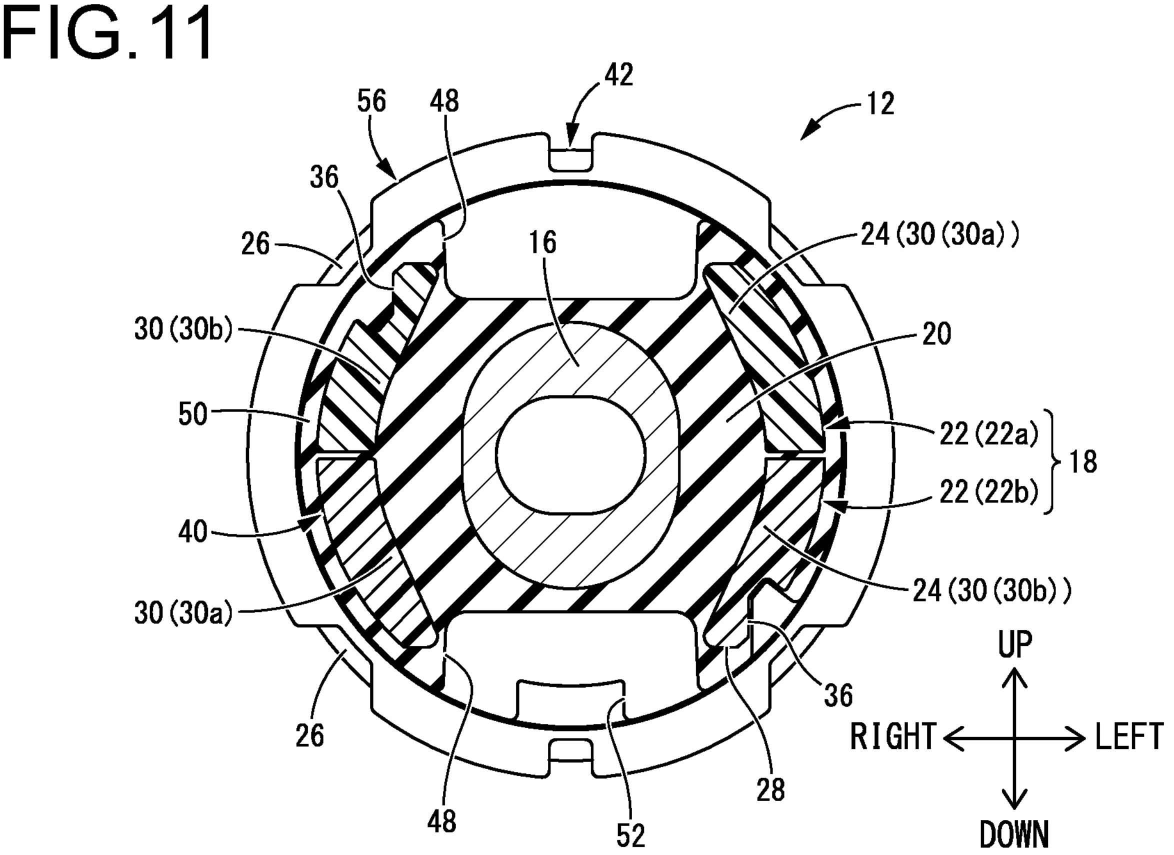
FIG. 11 is a cross section view taken along line 11-11 of FIG. 8.
Figure 12:
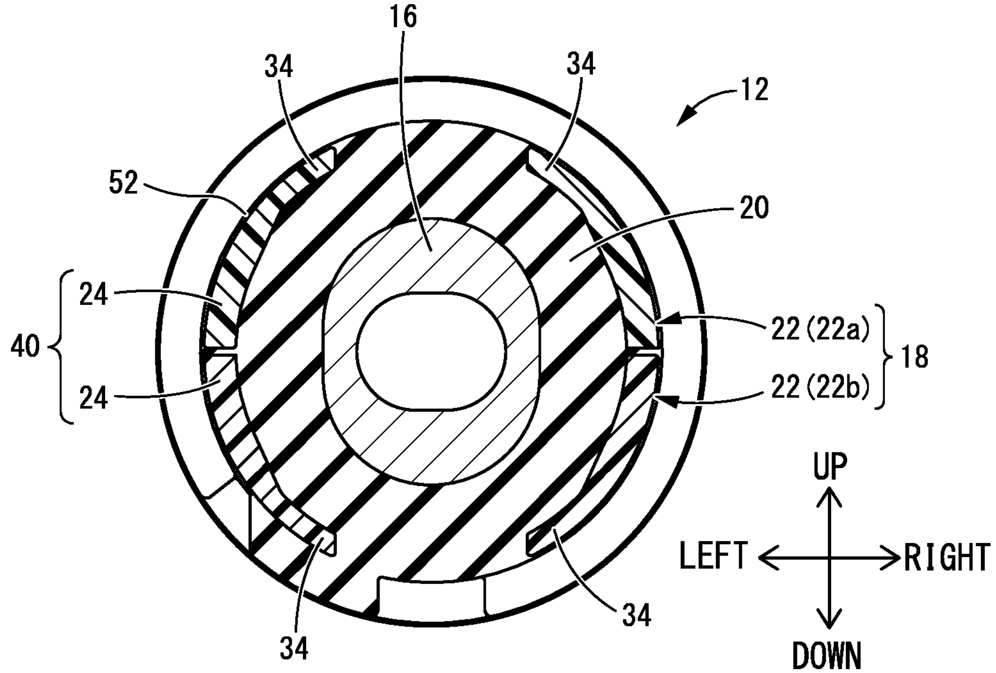
FIG. 12 is a cross section view taken along line 12-12 of FIG. 7.
Figure 13:
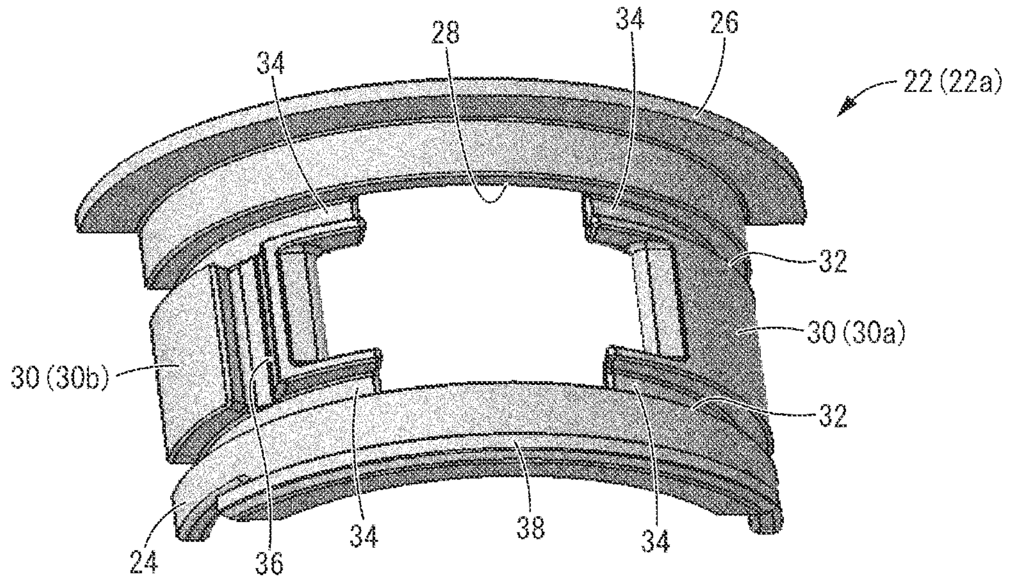
FIG. 13 is a perspective view showing a sleeve division constituting the integrally vulcanization molded component shown in FIG. 3.
Figure 14:
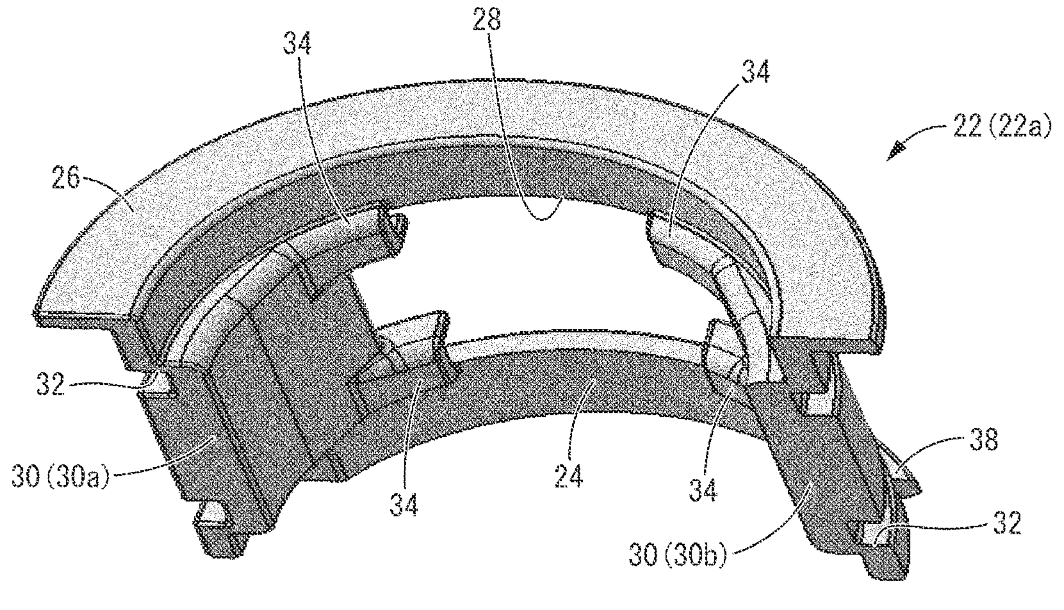
FIG. 14 is a perspective view showing the sleeve division shown in FIG. 13 from another angle.

The main rubber elastic body 20 has a pair of recesses 48, 48. As shown in FIGS. 8 and 11, the recesses 48, 48 are provided at the upper and lower sides of the inner axial member 16 and open to the upper and lower sides on the outer circumferential surface of the main rubber elastic body 20. The recesses 48, 48 are aligned with the windows 28, 28 of the intermediate sleeve 18 and are open to the outer circumferential side through the windows 28, 28.

An outer circumference rubber 50 is fixed to the outer circumferential surface of the tubular part 40 of the intermediate sleeve 18. The outer circumference rubber 50 is integrally formed with the main rubber elastic body 20. The outer circumference rubber 50 is provided on the front side of the positioning projection 38 in the axial direction, so that the positioning projection 38 is exposed without being covered by the outer circumference rubber 50.

Figure 4:
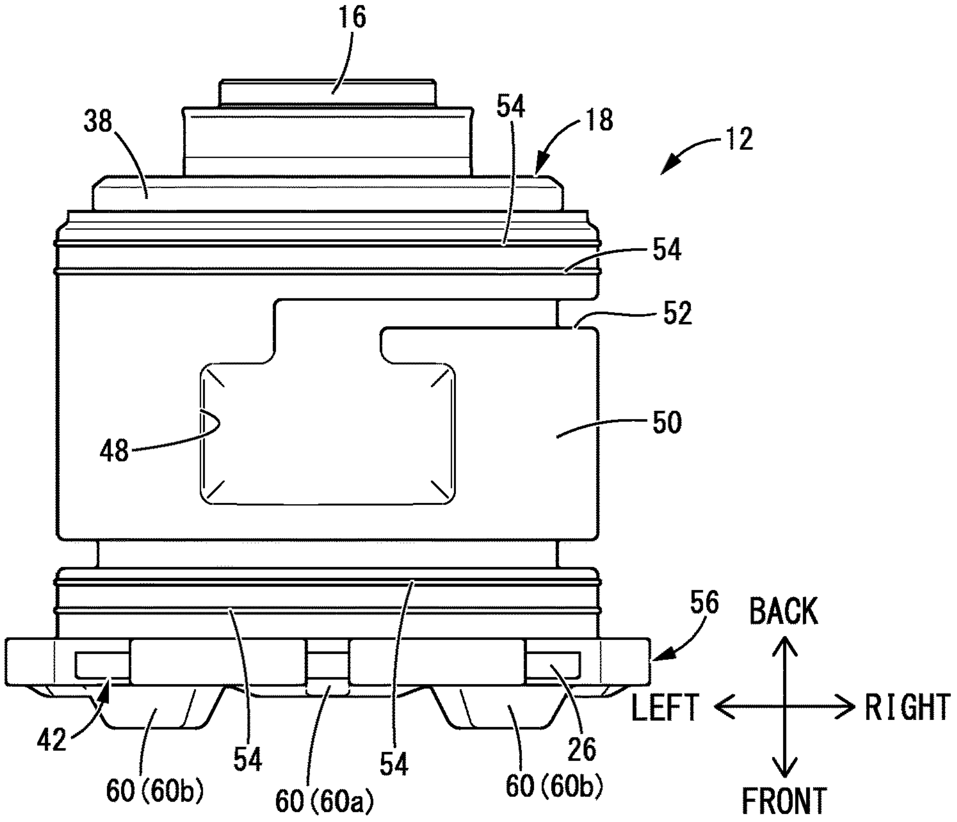
FIG. 4 is a plan view of the integrally vulcanization molded component shown in FIG. 3.
Figure 5:
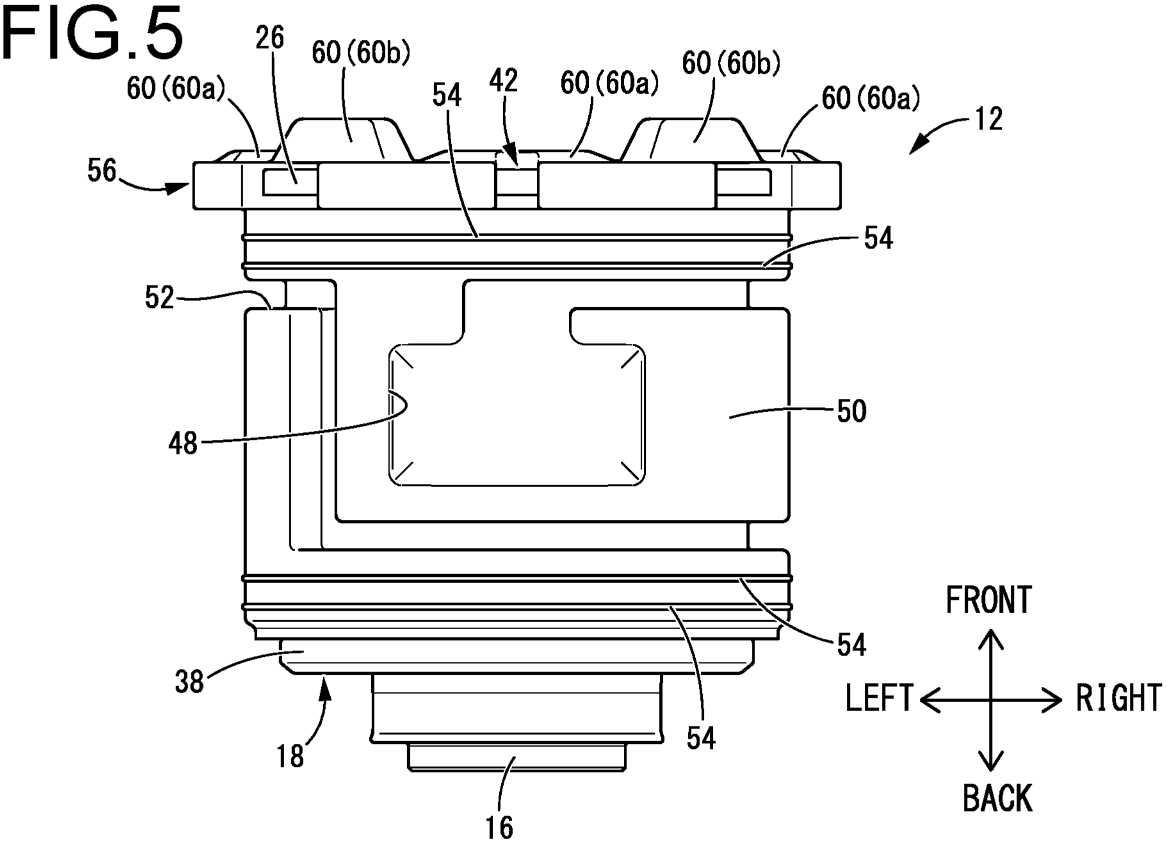
FIG. 5 is a bottom view of the integrally vulcanization molded component shown in FIG. 3.
Figure 6:
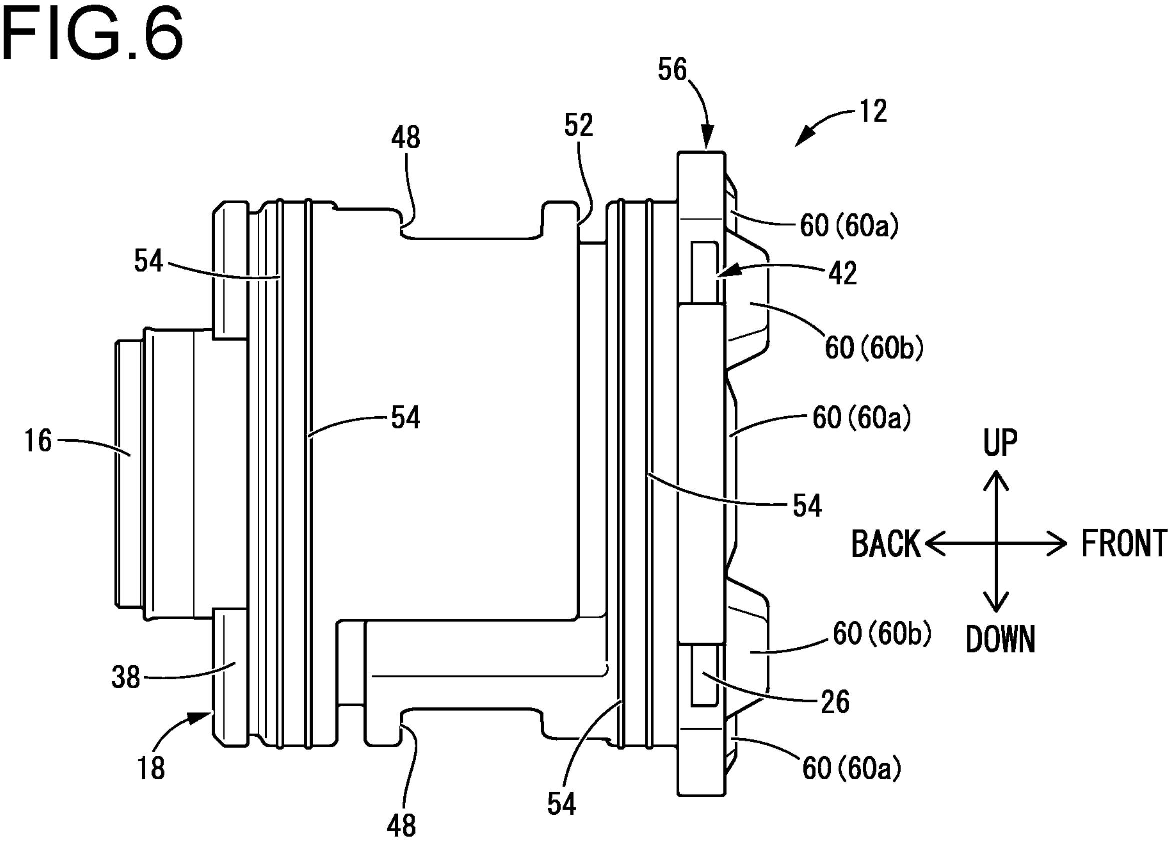
FIG. 6 is a left-side view of the integrally vulcanization molded component shown in FIG. 3.
Figure 7:
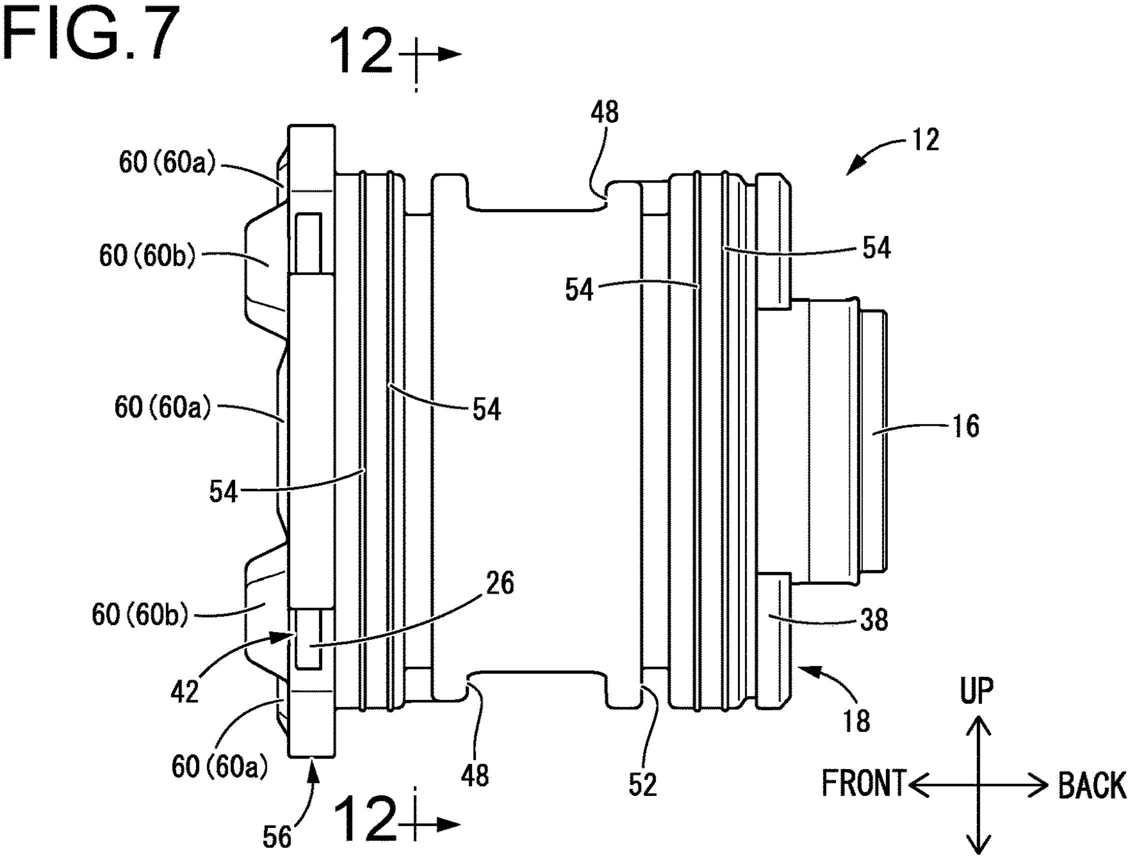
FIG. 7 is a right-side view of the integrally vulcanization molded component shown in FIG. 3.

The outer circumference rubber 50 is fixed to the outer circumferential surface of the tubular part 40 of the intermediate sleeve 18, so that the circumferential groove 32 and the longitudinal groove 36 are suitably filled with the outer circumference rubber 50, as shown in FIGS. 4 to 7. This forms an orifice groove 52 that extends for a length exceeding one lap in the circumferential direction and communicates the pair of recesses 48, 48 with each other. Both ends of the orifice groove 52 extend inward in the axial direction and are connected to the circumferential center portions of the recesses 48, 48, as shown in FIGS. 4 and 5. A portion of the orifice groove 52 is formed in the circumferential extension 34, which constitutes a portion of the circumferential groove 32.

At the portion of the outer circumference rubber 50 that is located axially outside the circumferential groove 32, a seal lip 54 is continuously formed over the entire circumference so as to protrude toward the outer circumference. The seal lip 54 has a tapered cross-sectional shape and protrudes toward the outer circumference. In this practical embodiment, two seal lips 54, 54 are provided in parallel, separated from each other before the front circumferential grooves 32, 32, while two seal lips 54, 54 are provided in parallel, separated from each other behind the rear circumferential grooves 32, 32.

The outer flange 42 is covered with a covering rubber 56, which is integrally formed with the main rubber elastic body 20 and the outer circumference rubber 50. The outer flange 42 is partially exposed from the covering rubber 56 at several circumferential locations, as shown in FIGS. 3 to 8.

The covering rubber 56 includes a contact rubber 58 covering the rear surface of the outer flange 42. The portion of the covering rubber 56 covering the front surface of the outer flange 42 is provided with a plurality of stopper rubbers 60 protruding forward. The stopper rubbers 60 are fixed to the front surface of the outer flange 42 and are in the forms of approximately rectangular blocks that are tapered, or thinned toward the protruding tips. In this practical embodiment, eight stopper rubbers 60 are provided, as spaced apart from each other in the circumferential direction. The stopper rubbers 60 include stopper rubbers 60*a*, which have a large projected area in the axial direction and a small protruding height, and stopper rubbers 60*b*, which have a small projected area in the axial direction and a large protruding height. These stopper rubbers 60*a* and 60*b* are arranged alternately in the circumferential direction.

As shown in FIGS. 1 and 2, the outer tubular member 14 is attached to the intermediate sleeve 18 of the integrally vulcanization molded component 12. The outer tubular member 14 is cylindrical in shape as a whole and has a flange part 62 protruding to the outer circumference at the front end. The outer tubular member 14 is made of metal in this practical embodiment, but may be made of synthetic resin, for example. To the outer tubular member 14, any rubber is not fixed, and the outer tubular member 14 is made of a single piece of metal or synthetic resin, and in this practical embodiment, it is a single fitting.

The intermediate sleeve 18 covered with the outer circumference rubber 50 is inserted in and assembled to the outer tubular member 14. By assembling the outer tubular member 14 to the intermediate sleeve 18, the inner axial member 16 and the outer tubular member 14 are connected by the main rubber elastic body 20.

The tubular part 40 of the intermediate sleeve 18 is secured press-fit with rubber into the inner circumference of the outer tubular member 14 via the outer circumference rubber 50, and the outer circumference rubber 50 is compressed between the tubular part 40 and the outer tubular member 14 in the radial direction. The flange part 62 is overlapped with the outer flange 42 of the intermediate sleeve 18 via the contact rubber 58 in the axial direction, so that the outer tubular member 14 is positioned relative to the intermediate sleeve 18 in the axial direction. By interposing the contact rubber 58 between the outer flange 42 of the intermediate sleeve 18 and the flange part 62 of the outer tubular member 14, errors such as tolerances in the dimensions of the parts are absorbed by the deformation of the contact rubber 58. The intermediate sleeve 18 and the outer tubular member 14 are assembled in an appropriate relative position in the axial direction and damages or the like due to direct contact between the outer flange 42 and the flange part 62 is avoided.

In this practical embodiment, in the integrally vulcanization molded component 12, the opposing faces of the circumferential edge surfaces of the sleeve divisions 22*a*, 22*b* are separated from each other, and the distance between the opposing faces is shortened by the press-fit assembly of the intermediate sleeve 18 into the outer tubular member 14. Therefore, the main rubber elastic body 20 is compressed in the axis-perpendicular direction by the press-fit assembly of the intermediate sleeve 18 into the outer tubular member 14, and the tensile strain of the main rubber elastic body 20 upon a vibration input is further decreased to improve durability. Since the circumferential edge surfaces of the sleeve divisions 22*a*, 22*b* face each other in the vertical direction, which is the main vibration input direction, the main rubber elastic body 20 is pre-compressed in the vertical direction to improve durability against the main vibration input.

When the intermediate sleeve 18 and the outer tubular member 14 are positioned by overlapping the outer flange 42 and the flange part 62, the backward slipping of the outer tubular member 14 from the intermediate sleeve 18 is prevented by the engagement of the rear surface of the outer tubular member 14 with the positioning projection 38. In other words, the outer tubular member 14 is assembled to the tubular part 40 of the intermediate sleeve 18 between the axially opposed surfaces of the outer flange 42 and the positioning projection 38, and the outer tubular member 14 is positioned relative to the intermediate sleeve 18 in the axial direction. This holds the outer tubular member 14 in a state it is fitted externally onto and assembled to the intermediate sleeve 18, thereby restricting misalignment in the axial direction between the intermediate sleeve 18 and the outer tubular member 14.

A pair of liquid chambers 64, 64 are formed by the outer tubular member 14 covering each opening of the recesses 48, 48 of the main rubber elastic body 20. The liquid chambers 64 are provided at formation portions of the windows 28, 28 and its wall is constituted by the main rubber elastic body 20 including the wall portion covering the inner circumferential surfaces of the windows 28, 28, so that internal pressure fluctuations are induced by deformation of the main rubber elastic body 20. The liquid chamber 64 is filled with a liquid such as water, ethylene glycol, silicone oil, or a mixture thereof, etc. The sealed fluid is not limited to those shown in the examples, but is suitably a non-compressible liquid. Also, the sealed fluid is desirably a liquid of low viscosity.

The outer circumferential opening of the orifice groove 52 formed in the outer circumference rubber 50 is covered by the outer tubular member 14 to form an orifice passage 66 that communicates the two liquid chambers 64, 64 with each other. During vibration input, the relative internal pressure fluctuations in the liquid chambers 64, 64 cause the liquid to flow between the liquid chambers 64, 64 through the orifice passage 66, thereby exerting a vibration damping effect based on the liquid flow action. Preferably, for the orifice passage 66, the resonance frequency (tuning frequency) of the flowing liquid is adjusted to the frequency of the vibration to be damped.

In this practical embodiment, the orifice groove 52 is formed utilizing the circumferential groove 32 formed in the intermediate sleeve 18, and there is no orifice forming member separate from the intermediate sleeve 18. Thus, the intermediate sleeve 18 can be assembled to the outer tubular member 14 by rubber press-fit, and there is no need to reduce the diameter of the outer tubular member 14 when the outer tubular member 14 is fitted externally onto the intermediate sleeve 18 in order to fit and fix them. This eliminates the process of reducing the diameter of the outer tubular member 14, which facilitates manufacturing, reduces the manufacturing costs, simplifies the structure, and the like.

In relation to the circumferential groove 32 provided in the intermediate sleeve 18, the circumferential length is kept long by the circumferential extension 34, which narrows the area formed only by rubber outside the circumferential groove 32 in the wall of the orifice groove 52 (the orifice passage 66). This suppresses deformation of the wall of the orifice passage 66 due to the action of liquid pressure, and the vibration damping effect by fluid flow through the orifice passage 66 is stably exhibited.

The opening edges of the recesses 48, 48 and the orifice groove 52 are each constituted by the outer circumference rubber 50, and the inner circumferential surface of the outer tubular member 14 is pressed against the outer circumference rubber 50, so that each opening of the recesses 48, 48 and the orifice groove 52 is covered by the outer tubular member 14 in a liquid-tight manner. In this practical embodiment, the liquid sealing area is set in the center portion in the axial direction, and the seal lips 54 are provided on both outsides of the liquid sealing area in the axial direction. As a result, when the intermediate sleeve 18 is press-fitted in and assembled to the outer tubular member 14, the seal lip 54 is pressed against the inner circumferential surface of the outer tubular member 14 to form a sealing structure, thereby more securely preventing liquid leakage from the liquid sealing area to the outside in the axial direction.

The member mount 10, for example, connects the vehicle body and the suspension member in a vibration-damping manner by the inner axial member 16 being attached to the vehicle body and by the outer tubular member 14 being attached to the suspension member. When the member mount 10 is mounted on the vehicle in this way, on a vertical vibration input, a relative pressure difference is generated between the pair of liquid chambers 64, 64, causing fluid flow through the orifice passage 66, thus exhibiting the vibration damping effect based on the flow action of the liquid.

Furthermore, a not-shown member on the vehicle body side to be attached to the inner axial member 16 has a stopper receiving portion that faces the outer flange 42 of the intermediate sleeve 18, on the front side in the axial direction. Contact of the stopper receiving portion on the outer flange 42 via the stopper rubber 60 limits the amount of displacement of the inner axial member 16 to the front side in the axial direction relative to the outer tubular member 14, and the durability is improved by limiting the amount of deformation of the main rubber elastic body 20.

Although the practical embodiment of the present disclosure has been described in detail above, the present disclosure is not limited by that specific description. For example, the pair of sleeve divisions constituting the intermediate sleeve is not necessarily limited to mutually identical shapes, but can be a combination of different shapes.

The passage cross-sectional area, the cross-sectional shape, and the route, etc. of the orifice passage are not particularly limited and may be changed and set as appropriate depending on, for example, the frequency of the vibration to be damped, or the like. A plurality of orifice passages may be provided. When the plurality of orifice passages are formed, the tuning frequencies of these orifice passages may be either the same or different from each other.

What is claimed is:

1. A liquid-filled tubular vibration damping device comprising:

an inner axial member;

an intermediate sleeve having a tubular part, the intermediate sleeve being made of a synthetic resin and having a structure which is formed by a pair of sleeve divisions and divided into two in a circumferential direction;

a main rubber elastic body connecting the inner axial member and the tubular part of the intermediate sleeve;

an outer tubular member receiving the tubular part of the intermediate sleeve such that the tubular part is inserted in and assembled to the outer tubular member;

a pair of liquid chambers formed in the main rubber elastic body;

an orifice passage communicating the pair of liquid chambers with each other;

an outer flange formed at a first end in an axial direction of the tubular part of the intermediate sleeve;

an outer circumference rubber fixed to an outer circumferential surface of the tubular part of the intermediate sleeve, the tubular part to which the outer circumference rubber is fixed being secured press-fit in and assembled to the outer tubular member; and an orifice groove formed in the outer circumference rubber and covered by the outer tubular member so that the orifice passage is formed, wherein at a second end of the tubular part of the intermediate sleeve in the axial direction, a positioning projection is provided projecting to an outer circumference and facing the outer flange in the axial direction, and the outer tubular member is assembled to the intermediate sleeve between the outer flange and the positioning projection in the axial direction, and the outer tubular member is positioned relative to the intermediate sleeve in the axial direction.

2. The liquid-filled tubular vibration damping device according to claim 1, wherein the outer tubular member is constituted by a single fitting to which no rubber is fixed.

3. The liquid-filled tubular vibration damping device according to claim 2, wherein a stopper rubber is fixed to a first surface of the outer flange in the axial direction and protrudes to a side opposite to the tubular part in the axial direction, and a contact rubber is fixed to a second surface of the outer flange in the axial direction and interposed between the outer flange and the outer tubular member in the axial direction.

4. The liquid-filled tubular vibration damping device according to claim 1, wherein in the tubular part of the intermediate sleeve, a middle portion in the axial direction is a thick-walled portion thicker than both end portions.

5. The liquid-filled tubular vibration damping device according to claim 1, wherein a pair of windows are formed through the tubular part of the intermediate sleeve, and the pair of liquid chambers are formed including the pair of windows, in at least one edge of at least one of the windows in the axial direction, a circumferential extension is provided extending from a circumferential edge of the at least one of the windows into the at least one of the windows, and a portion of the orifice groove is formed in the circumferential extension.

6. The liquid-filled tubular vibration damping device according to claim 5, wherein the circumferential extension is provided on each side of the at least one of the windows in the axial direction.

7. The liquid-filled tubular vibration damping device according to claim 1, wherein a distance between circumferential edge surfaces of the pair of sleeve divisions in the intermediate sleeve is shortened by compressing the main rubber elastic body on press-fit assembly of the intermediate sleeve into the outer tubular member.

* * * * *